(12) United States Patent
Tuo et al.

(10) Patent No.: US 9,279,686 B2
(45) Date of Patent: Mar. 8, 2016

(54) SYSTEMS AND METHODS FOR INDOOR NAVIGATION CONTROL BY LED LIGHTING DEVICES

(71) Applicant: ZHEJIANG SHENGHUI LIGHTING CO., LTD, Jiaxing (CN)

(72) Inventors: Jiabin Tuo, Jiaxing (CN); Jinxiang Shen, Jiaxing (CN)

(73) Assignee: ZHEJIANG SHENGHUI LIGHTING CO., LTD., Jiaxing (CN)

(*) Notice: Subject to any disclaimer, the term of this patent is extended or adjusted under 35 U.S.C. 154(b) by 0 days.

(21) Appl. No.: 14/488,683

(22) Filed: Sep. 17, 2014

(65) Prior Publication Data

US 2015/0038165 A1 Feb. 5, 2015

Related U.S. Application Data

(63) Continuation of application No. PCT/CN2014/082097, filed on Jul. 11, 2014.

(30) Foreign Application Priority Data

Jul. 18, 2013 (CN) .......................... 2013 1 0308124

(51) Int. Cl.
*H04W 4/04* (2009.01)
*G01C 21/20* (2006.01)
*H04W 4/02* (2009.01)
*H05B 37/02* (2006.01)

(52) U.S. Cl.
CPC ............ *G01C 21/206* (2013.01); *H04W 4/023* (2013.01); *H04W 4/043* (2013.01); *H05B 37/0272* (2013.01); *Y02B 20/42* (2013.01); *Y02B 20/445* (2013.01); *Y02B 20/48* (2013.01)

(58) Field of Classification Search
None
See application file for complete search history.

(56) References Cited

U.S. PATENT DOCUMENTS

2013/0030747 A1* 1/2013 Ganick ................ G01C 21/206
702/95
2014/0286644 A1* 9/2014 Oshima ................ H04B 10/11
398/118

* cited by examiner

*Primary Examiner* — Diane Mizrahi
(74) *Attorney, Agent, or Firm* — Anova Law Group, PLLC (57) ABSTRACT

The present disclosure provides an indoor navigation control system containing at least two LED lighting devices and a location server. Each LED lighting device includes a Wi-Fi module and a driving power supply, and is used as a wireless access node to transmit Wi-Fi signals to an adjacent node. Nodes within a Wi-Fi signal coverage area have Internet or LAN access. The location server stores location information of the Wi-Fi module of each LED lighting device. The LED lighting devices and the location server communicate with a smart terminal to calculate a position, a moving direction, and a moving speed of an object according to the location information of each LED lighting device and a moving time length of the object. The Wi-Fi module of each LED lighting device further controls the driving power supply to adjust the status of the LED lighting device according to a control command from the smart terminal.

20 Claims, 5 Drawing Sheets

SYSTEMS AND METHODS FOR INDOOR NAVIGATION CONTROL BY LED LIGHTING DEVICES

CROSS-REFERENCES TO RELATED APPLICATIONS

This application is a continuation application of PCT Patent Application No. PCT/CN2014/082097, filed on Jul. 11, 2014, which claims priority to Chinese Patent Application No. 201310308124, filed on Jul. 18, 2013, the entire content of which is incorporated herein by reference.

FIELD OF THE DISCLOSURE

The present disclosure generally relates to the field of LED (i.e., light emitting diode) lighting technology and, more particularly, relates to systems and methods for indoor navigation control by LED lighting devices.

BACKGROUND

LED lighting may generally provide advantages in energy conservation, environmental protection, controllable lighting, solid state lighting, and long operational lifetime. LED lighting devices thus have been widely used in various areas for public, commercial, and indoor lighting.

There has been an increasing focus on precise positioning and navigation to places of interest. Positioning technologies such as global positioning system (GPS), cellular base positioning, and Wi-Fi hotspot positioning have been commonly used.

The GPS technologies use signals sent from satellites that are evenly distributed and surrounding the earth to achieve precise positioning in an open outdoor environment. GPS signals can provide global coverage and work at any time of the day. GPS signals are used in a wide range of applications with high accuracy. For each positioning operation, however, GPS processor needs to search GPS satellite signals that are currently available (generally involving at least three or more satellites) and then calculate accurate position information using related signal processing programs and algorithms. It often takes a long time for a system to accurately position a device when GPS technologies are used, which, as a result, requires high power consumption. In addition, GPS satellite signals may be blocked by high-rise buildings and ceilings of rooms. GPS technologies thus cannot be effectively used in an indoor environment or in an area having buildings with high density.

Mobile operators often use widely-distributed cellular base stations. The cellular base stations may have a limit for signal propagation up to several kilometers. Each base station has its unique encoding information and precise location information. Therefore, whether it is indoor or outdoor, the base station technologies may perform positioning operations using received data of precise location information (corresponding to the unique encoding of the base station) and signal strength for calculations. Compared with GPS technologies, the base station technologies may take less time for positioning. However, significant inaccuracies (e.g., in a range from a few hundreds to a few thousands meters) may occur. The accuracy of base station based technologies depends upon the distribution/coverage range of base stations, the radio propagation environment, the number of signals that the base station can receive, etc.

Wi-Fi signal itself does not provide any positioning or navigation ability. However, Wi-Fi router and hotspot module have features including: (a) a relatively-fixed position (rarely being moved); (b) a globally unique MAC (i.e., media access control) address for the processor; and (c) a relatively short Wi-Fi signal propagation distance.

Typically, the GPS location information, the encoding information of a base station of the mobile operator, and the MAC address information of a Wi-Fi hotspot may be automatically collected by a mobile device in an outdoor environment. Such non-processed location data may then be sent to a location server for further calculations and calibrations to provide accurate location information that can be sent back to the mobile device.

Compared with GPS and base station based technologies, positioning based on Wi-Fi hotspots may use less time and may provide high efficiency. In addition, precise position information of Wi-Fi hotspot may be stored in a database of the location server under a unique MAC address. When the mobile device performs indoor positioning operations again, even without GPS or base station positioning signals, location information in the location server corresponding to the MAC address of the Wi-Fi hotspot can be directly called in combination with signal strength of the received Wi-Fi signals to quickly perform the positioning operations. Wi-Fi hotspot technologies are suitable for positioning in a small area. Currently, the Wi-Fi hotspot technologies have been widely used in many applications/software products for a mobile device.

However, Wi-Fi wireless router is configured in a relatively fixed location with a signal transmission distance of tens or hundreds of meters. All mobile devices under the Wi-Fi signal coverage can only use location data that are previously saved on the location server by the corresponding Wi-Fi wireless router. In addition, the Wi-Fi hotspot technologies are restricted by the service range. Further, the Wi-Fi hotspot technologies cannot provide information regarding direction, speed, and/or other navigation data. Furthermore, the Wi-Fi hotspot technologies cannot be used offline.

Thus, there is a need to overcome these and other problems of the prior art and to provide systems and methods for indoor navigation control by LED lighting devices.

BRIEF SUMMARY OF THE DISCLOSURE

One aspect or embodiment of the present disclosure includes an indoor navigation control system containing LED lighting devices. The indoor navigation control system includes at least two LED lighting devices configured in an indoor environment. Each LED lighting device includes a Wi-Fi module. Each LED lighting device is used as a wireless access node to receive a Wi-Fi signal and to transmit the received Wi-Fi signal to an adjacent node corresponding to an adjacent LED lighting device such that nodes within a Wi-Fi signal coverage area has an access to Internet or LAN (i.e., local area network). The indoor navigation control system further includes a location server configured to store location information of the Wi-Fi module of each LED lighting device with a unique MAC address. The at least two LED lighting devices and the location server are configured to communicate with a smart terminal to calculate a position, a moving direction, and a moving speed of an object according to the location information of each LED lighting device along with a moving time length of the object for an indoor navigation.

The indoor navigation control system further includes one of a wireless router and a wireless gateway. The one of the wireless router and the wireless gateway contains a Wi-Fi module.

The smart terminal is further configured to read status of each LED lighting device and to remotely control lighting of each LED lighting device. The smart terminal is further configured to use the Wi-Fi module of each LED lighting device to transmit or receive a control command and a status command of each LED lighting device.

The terminal device includes a desktop computer, a laptop, a tablet PC, a smart phone, and a remote control. The object for the indoor navigation includes the terminal device.

Each LED lighting device further includes a driving power supply, an LED light-emitting component, and a RF (radio frequency) antenna. The Wi-Fi module of each LED lighting device is configured to receive data from a wireless router or a wireless gateway via the RF antenna, to process the data, and to send the processed data to the smart terminal via the RF antenna.

The Wi-Fi module of each LED lighting device is configured to control the driving power supply to control a switching status, brightness, and color temperature of the LED lighting device according to a control command signal sent from the smart terminal. The Wi-Fi module of each LED lighting device and the driving power supply are integrated together on a same circuit board or are connected together via a connector. The Wi-Fi module of each LED lighting device is attached on an outer surface of a housing of the LED lighting device or configured independently from the LED lighting device.

Another aspect or embodiment of the present disclosure includes an indoor navigation control method using LED lighting devices. At least two LED lighting devices are configured in an indoor environment to form a wireless local area network for data transmission. Each LED lighting device includes a Wi-Fi module. Each LED lighting device is used as a wireless access node to receive a Wi-Fi signal and to transmit the received Wi-Fi signal to an adjacent node corresponding to an adjacent LED lighting device. Location information of the Wi-Fi module of each LED lighting device having a unique MAC address is stored into a location server using a Wi-Fi positioning method. A node distribution plan is generated using a triangulating estimation method to calibrate node distribution, according to the location information of each LED lighting device in the location server along with Wi-Fi signal strength. A position, a moving direction, and a moving speed of an object in the indoor environment are calculated according to the location information of each LED lighting device and according to a moving time length of the object for an indoor navigation based on the node distribution plan.

When the node distribution plan is generated, the node distribution plan is calibrated and optimized by uploading a building floor plan. The building floor plan is encrypted and downloading the building floor plan requires a downloading authorization, when the building floor plan involves a building structure secret.

The node distribution plan is generated by a smart terminal. The smart terminal allows the Wi-Fi module of each LED lighting device to be independently named such that precise location information of each named LED lighting device is conveniently known and controlled. The Wi-Fi module of each LED lighting device is independently named in a group.

When the node distribution plan is generated, status of each LED lighting device is read and each LED lighting device is remotely controlled by using an administrator managing mode requiring an authorization to manage lighting control, internet access, and the node distribution plan of each LED lighting device. Optionally, based on the position of the object, shopping guide and navigation information are pushed to the object. The object for the indoor navigation includes the terminal device.

The node distribution plan is used to remotely control one LED lighting device or to remotely control all LED lighting devices configured in an area of the indoor environment. Such remote control includes control of switching on/off, adjusting brightness, setting time for turning on/off, and statistically collecting power consumption of one or more LED lighting devices.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Systems and methods based on LED lighting devices for indoor navigation control are provided. Multiple LED lighting devices can be widely distributed and relatively fixed in an indoor environment. Each LED lighting device can contain a Wi-Fi module and can have its own location information stored in a location server and have its own unique MAC address. That is, the actual location of each LED lighting device can be bound with its own unique MAC address.

In one embodiment, when a user enters into an unknown building, by communications among LED lighting devices, the location server, and a smart terminal (e.g., a smart phone), a node distribution plan for the unknown building can be generated and mapped. Each node corresponds to an LED lighting device. Compared with conventional Wi-Fi router-based technologies, the disclosed systems and methods can more accurately perform indoor positioning and navigation. For example, the disclosed systems and methods can be used in large venues, such as supermarkets, exhibition halls, and/or museums, to perform indoor positioning and navigation.

In addition, based on a current location of the user, promotion (e.g., shopping guide) and/or navigation information for that current location can be pushed to the user. Further, according to the positioning and navigation information, one or more LED lighting devices can be selected. The working (e.g., lighting) status of the selected LED lighting device(s) can be controlled.

Figure 1:
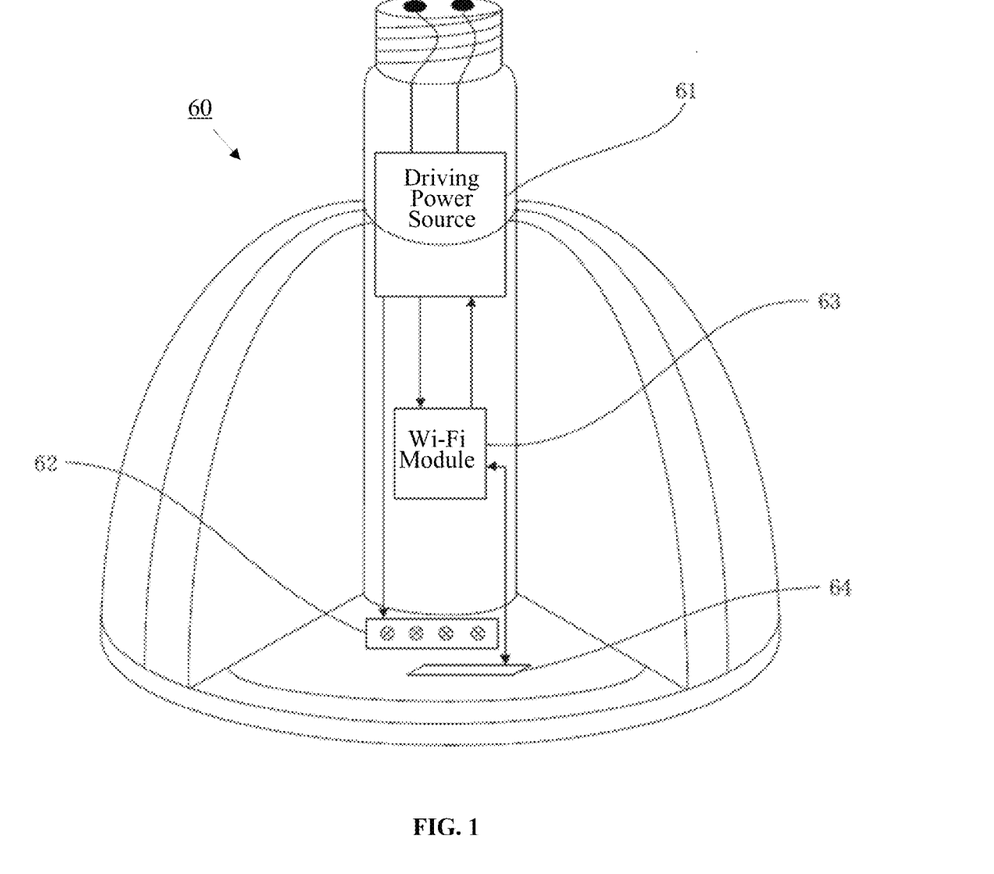
FIG. 1 depicts an exemplary LED lighting device including a Wi-Fi module consistent with various disclosed embodiments.

FIG. 1 depicts an exemplary LED lighting device including a Wi-Fi module consistent with various disclosed embodiments. As shown in FIG. 1, the exemplary LED lighting device 60 can include a driving power supply 61, an LED light-emitting component 62, a Wi-Fi module 63, and/or a RF (i.e., radio frequency) antenna 64.

The driving power supply 61 can be electrically connected to the LED light-emitting component 62 and the Wi-Fi module 63 to supply power and related control command signals to the LED light-emitting component 62 and the Wi-Fi module 63. The Wi-Fi module 63 and the RF antenna 64 can be electrically connected to transmit RF signals there-between.

Note that the LED lighting device 60 can be configured to have any desired shape, which is not limited to the shape shown in FIG. 1. In addition, the LED lighting device 60 can include any desired number and/or type of light sources (e.g., the LED light-emitting component 62 such as bulbs), although FIG. 1 shows four bulbs for illustration purposes. In one embodiment, one single bulb can be used as a light source. In another embodiment, one or more devices each including multiple bulbs can be used as a light source. The driving power of these bulb(s) can be connected to a same Wi-Fi module (or sometimes a controller) to control and adjust status of the LED lighting device 60.

The Wi-Fi module 63 can operate under a single band mode at 2.4 GHz or 5 GHz according to IEEE802.11 standard. Alternatively, the Wi-Fi module 63 can operate under a dual band mode at 2.4 GHz and 5 GHz according to IEEE802.11 standard. The Wi-Fi module 63 can receive data from a wireless router or a wireless gateway (a wireless router/gateway) via the RF antenna 64. The Wi-Fi module 63 can process the data via an internal signal processing by a processor. The processed data can be sent to a user terminal (not shown in FIG. 1), such as a smart terminal, via the RF antenna 64. Meanwhile, the RF antenna 64 can receive a control command signal sent from the smart terminal and then send the control command signal to the Wi-Fi module to realize a network configuration (e.g., including the multiple LED lighting devices) and a status control of the LED lighting device 60.

The Wi-Fi module 63 can control the driving power supply 61 to control a switching status, brightness, and a color temperature of the LED lighting device 60, according to a control command signal, such as a PWM (i.e., pulse width modulation) signal, sent from the smart terminal.

The Wi-Fi module 63 can be built within the LED lighting device 60. For example, the Wi-Fi module 63 and the driving power supply 61 can be integrated together on the same circuit board. Alternatively, the Wi-Fi module 63 and the driving power supply 61 can be connected together via a connector.

In some embodiments, the Wi-Fi module 63 can be configured outside of the LED lighting device 60. For example, the Wi-Fi module 63 can be mounted or attached to an outer surface of a housing of the LED lighting device 60. Alternatively, the Wi-Fi module 63 can be configured independently from the LED lighting device 60.

The RF antenna 64 can be discretely configured, or can be integrated onto a circuit board. For example, to maintain a desired RF signal transmission without affecting light output of the LED lighting device 60, the RF antenna 64 can be mounted or attached to an outer surface of the housing of the LED lighting device 60; or can be mounted or attached to any component within the LED lighting device 60; or can be integrated onto a circuit board connecting the LED light-emitting module 62 and/or the driving power supply 61.

Figure 2:
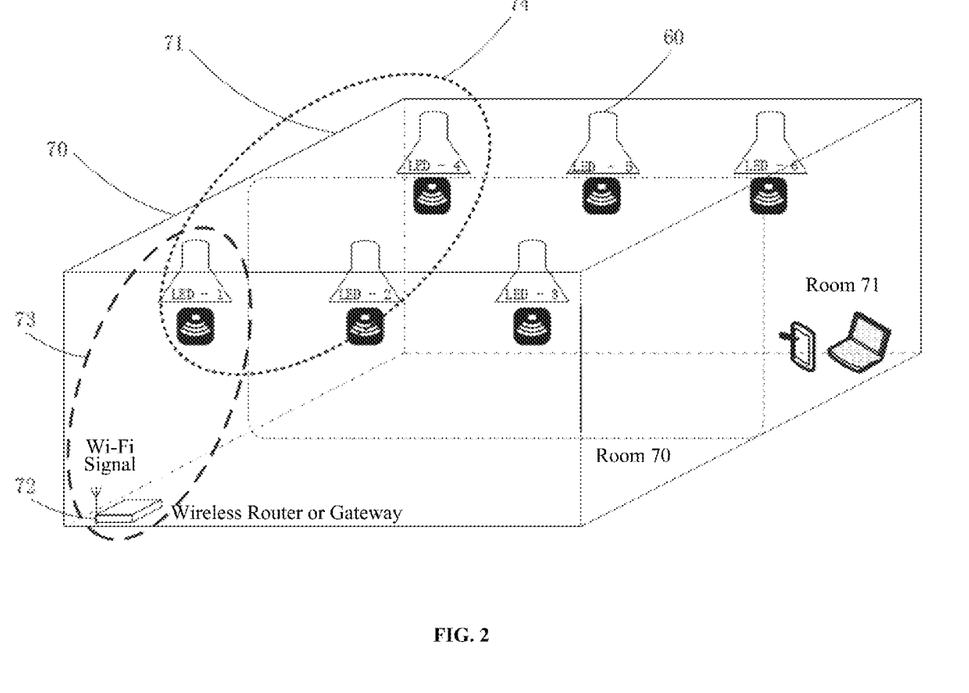
FIG. 2 depicts an exemplary wireless local area network (LAN) including LED lighting devices in a building consistent with various disclosed embodiments.

FIG. 2 depicts an exemplary wireless local area network (LAN) formed by multiple LED lighting devices in an exemplary building consistent with various disclosed embodiments.

As shown in FIG. 2, multiple LED lighting devices can be configured within an exemplary building to provide a three-dimensional distribution. Each LED lighting device can include a built-in Wi-Fi module. In the example of FIG. 2, the building can include two exemplary rooms: room 70 and room 71. Each room can be configured with three LED lighting devices 60. For example, room 70 can include LED-1, LED-2, and LED-3, while room 71 can include LED-4, LED-5, and LED-6.

Note that although two rooms are included in the exemplary building shown in FIG. 2 for illustration purposes, any number of room(s), more or less than two, can be included without limitation. In addition, although three LED lighting devices are configured in each exemplary room shown in FIG. 2 for illustration purposes, any number of LED lighting device(s), more or less than three, can be configured in one room.

A wireless router/gateway 72 can be placed, e.g., in a corner location of the room or building, due to limitations of distribution and length of optical fiber or ADSL telephone line used to connect the wireless router/gateway 72. Since the Wi-Fi signal provided by the wireless router/gateway 72 can have a limited coverage area, the Wi-Fi signal may not provide sufficient Internet connection for users a little far away from the wireless router/gateway 72 in the same building.

However, as disclosed, an LED lighting device (e.g., LED-1 in room 70 in FIG. 2) that is located nearby to the wireless router/gateway 72 can be utilized to receive and to continuously amplify the Wi-Fi signal transmitted from the wireless router/gateway 72. As such, the LED-1 in room 70 together with the wireless router/gateway 72 can form an increased Wi-Fi signal coverage area 73. Likewise, LED-2 and LED-4 that are located nearby to the LED-1 can receive and continuously amplify the Wi-Fi signal transmitted from LED-1 and thus to further expand the Wi-Fi signal coverage area shown as an expanded Wi-Fi signal coverage area 74 in FIG. 2.

In this manner, the widely distributed LED lighting devices within multiple rooms in a building can form a Wi-Fi network, e.g., having a mesh-type structure with uniform and stable Wi-Fi signal. As long as there is one LED lighting device on a node of the Wi-Fi network receives the Wi-Fi signal from the wireless router/gateway inside a building, the Wi-Fi signal can be progressively (e.g., in a manner of layer by layer) propagated via adjacent LED lighting devices to form the Wi-Fi Network with a wide coverage area and with stable signal.

Figure 3:
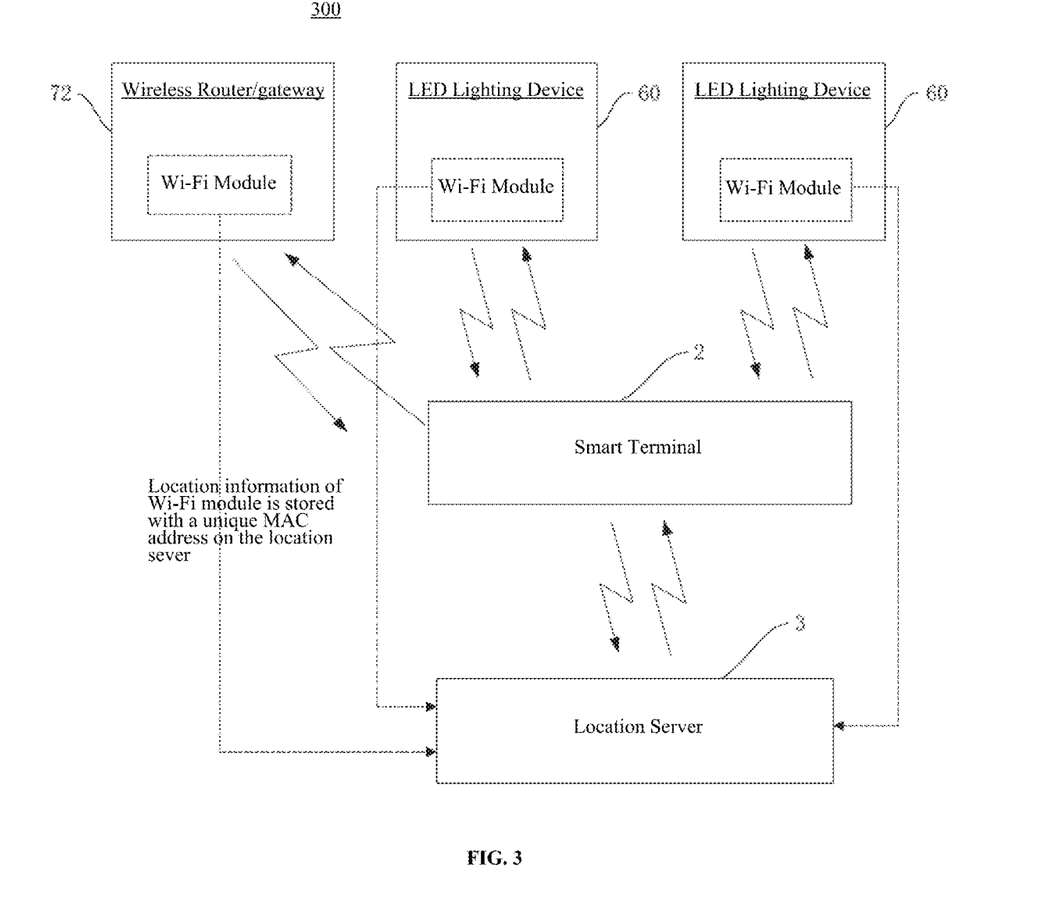
FIG. 3 depicts an exemplary indoor navigation control system containing LED lighting devices consistent with various disclosed embodiments.

FIG. 3 depicts an exemplary indoor navigation control system based on LED lighting devices consistent with various disclosed embodiments.

The exemplary indoor navigation control system 300 may include a wireless router/gateway 72, at least two LED lighting devices 60, a smart terminal 2, and/or a location server 3.

Each of the wireless router/gateway 72 and the at least two LED lighting devices 60 can include a Wi-Fi module, such that each LED lighting device 60 can be used as a wireless access node to receive a Wi-Fi signal and to further transmit the received Wi-Fi signal to allow other nodes within the Wi-Fi signal coverage area to have an access to the Internet or a LAN.

The Wi-Fi module in each of the wireless router/gateway 72 and the at least two LED lighting devices 60 can store precise location information of the Wi-Fi module under its own unique MAC address on the location sever 3.

Service providers for the location server 3 can include, e.g., Google, Skyhook Wireless, Navizon, and/or other suitable providers. Suitable terminal application programs can be installed in the smart terminal 2. Each Wi-Fi module of the wireless router/gateway 72 and the at least two LED lighting devices 60 can be connected to the terminal application programs. The terminal application programs can call and process location information corresponding to a desired individual Wi-Fi module from the location server 3, according to the unique MAC address of that individual Wi-Fi module.

When a location navigation service is needed by the user, a terminal application program running on the smart terminal 2 can send a request command to the location server and call a geocoding location on the location server corresponding to a MAC address of each of the surrounding Wi-Fi modules. The geocoding location can include various data, e.g., longitude, latitude, and/or room name.

In one embodiment, the location of wireless router/gateway 72 can be used as a reference point, in combination with the location information of at least two nearby LED lighting devices 60, to estimate an approximate location of an object to be tested using a triangulating estimation method and a signal transmission loss model applied to each node that is able to receive the Wi-Fi signal. The more of LED lighting devices 60 is included and the more widely and uniformly the LED lighting devices 60 are distributed, the greater accuracy of the positioning services can be obtained.

In the meanwhile, the terminal application program can measure a time length that an object (e.g., the smart terminal held by a user, or a user) moves from one point to another point within the signal coverage area of each Wi-Fi module, i.e., using a distance difference, to calculate an azimuth (including e.g., a position or location) and/or data of a moving direction and a moving speed of the object or the user to achieve high-precision indoor navigation.

In addition, the smart terminal 2 (i.e., the user terminal) can read status of each node (corresponding to each Wi-Fi module of the LED lighting device) and remotely control the LED lighting device corresponding to each node in the indoor navigation control system. The smart terminal 2 can use the Wi-Fi module at each node as a Wi-Fi wireless access point to transmit and/or receive control and status command signals of each LED lighting device to ultimately control the LED lighting device at any point within the Wi-Fi signal coverage area.

The smart terminal 2 can include, e.g., desktop computers, laptops, tablet PCs, smart phones, and a specially-designed remote control.

Figure 4:
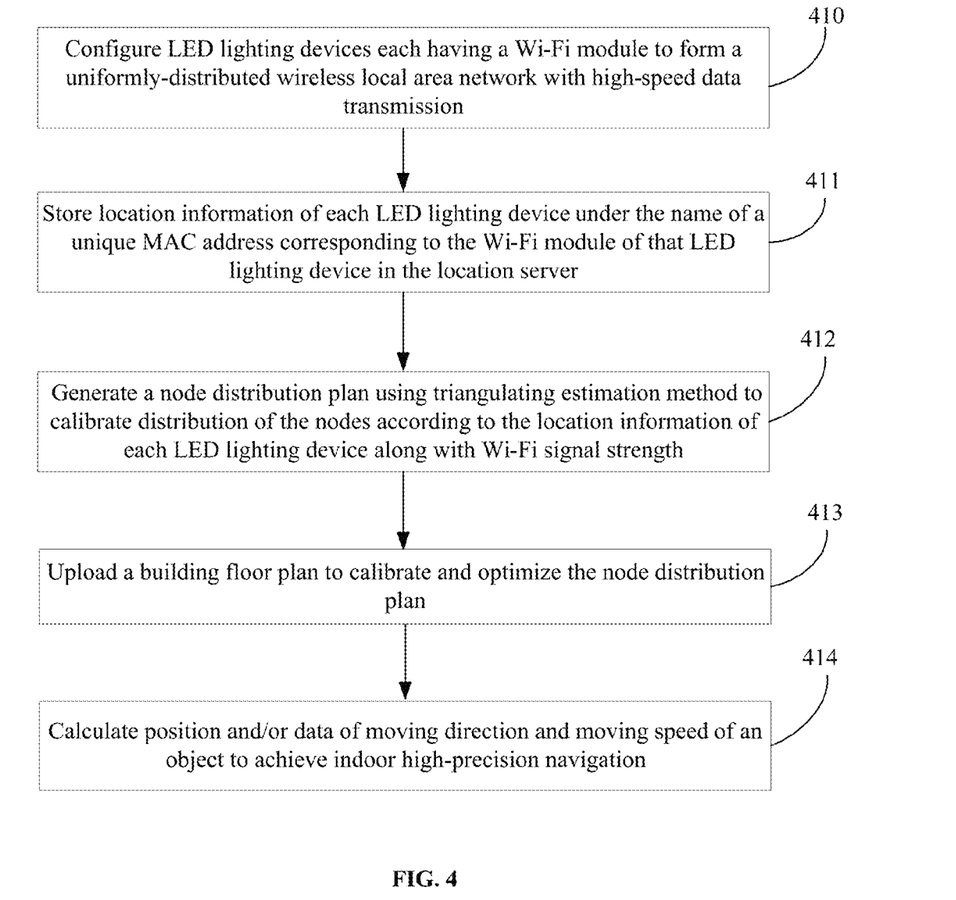
FIG. 4 depicts an exemplary indoor navigation control method using LED lighting devices consistent with various disclosed embodiments.

FIG. 4 depicts an exemplary indoor navigation control method using LED lighting devices consistent with various disclosed embodiments.

In Step 410, multiple LED lighting devices each built-in with a Wi-Fi module can be configured to form a uniformly-distributed wireless local area network with high-speed data transmission. For example, at least two LED lighting devices can be configured.

In Step 411, based on a Wi-Fi positioning method, location information of each node of the LED lighting device can be stored under the name of a unique MAC address corresponding to the Wi-Fi module of that LED lighting device in the location server.

In Step 412, according to the location information of each LED lighting device stored in the location server along with a Wi-Fi signal strength, the terminal application program can generate a node distribution plan (or plot) using triangulating estimation method to calibrate distribution of the nodes.

In Step 413, in some cases, the user can upload a building floor plan (or a building blueprint) to calibrate and optimize the node distribution plan.

In Step 414, because each node has a relatively fixed location and is close to other nodes, the terminal application program on the smart terminal can calculate a position, a moving direction, and a moving speed of an object (e.g., the smart terminal or a user) according to the location information of the node and moving time length of the object's movement to achieve indoor high-precision navigation.

In addition, for the node distribution plan based on the building floor plan as described in Step 413, confidential information related to building structure may be involved. In this case, the administrator of the smart terminal can manage the downloading of the building structure information with appropriate authorization level and with encryption, without affecting the operations of indoor navigations.

In various embodiments, the LED lighting devices can be installed in a supermarket, an exhibition hall, a museum, and/or other large venues. In addition to the navigation process depicted in Step 414, a general control module of an additional wireless LAN can be used to push information related to promotions (e.g., of shopping guide) and/or navigations, according to an instant position of a customer or a visitor. Information related to promotions and/or navigations can include, for example, publicity and navigation of product promotions, query and navigation of certain fixed products, recommendation and navigation of certain paths, background introduction of an exhibition point, query of stream distribution of people in each exhibition region, query of surrounding facilities and services, emergency escape routes, etc.

Figure 5:
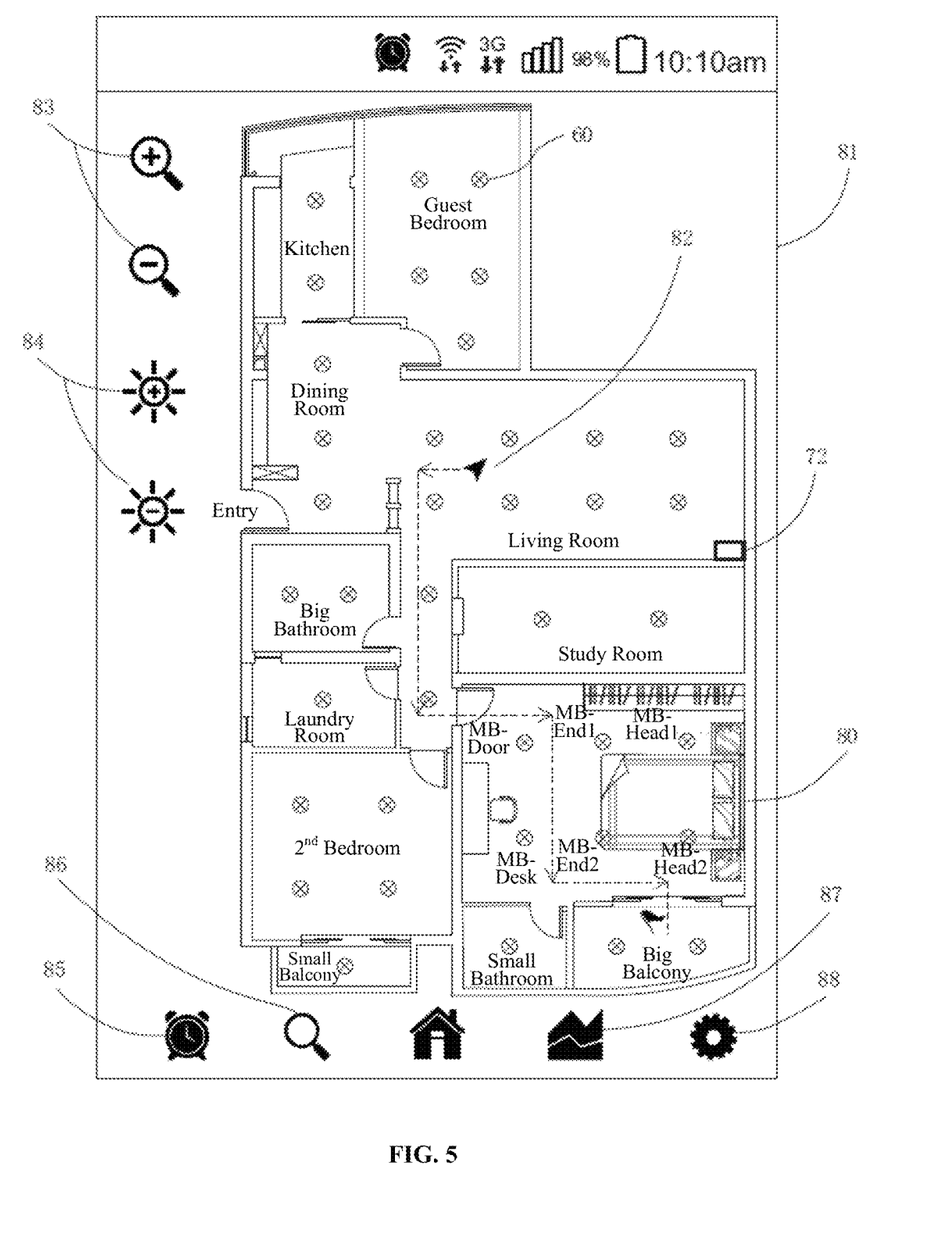
FIG. 5 depicts an exemplary control interface of a terminal application program on a smart terminal consistent with various disclosed embodiments.

FIG. 5 depicts an exemplary control interface of a terminal application program on a smart terminal for illustrating a positioning and/or navigation method in a house using the disclosed indoor navigation system. The exemplary control interface also illustrates remote controlling of selected LED lighting device(s) in the indoor navigation system, while performing positioning and/or navigation in the house.

As shown, the exemplary house can include a master bedroom 80, a second bedroom, a guest bedroom, a kitchen, a dining room, a living room, big and small bath rooms, big and small balconies, etc. The indoor navigation system (e.g., the system 300 of FIG. 3 including at least two LED lighting devices 60, a wireless router/gateway 72, a location server, etc.) can be adopted and accommodated to the exemplary house of FIG. 5.

Additionally, the control interface 81 can include zooming buttons 83, brightness-adjusting buttons 84, a timer button 85, a search button 86, a monitor button 87, and/or a setting button 88.

For example, to allow a user to clearly know his/her position in the house and to precisely control any LED lighting device(s) in the house, SSID (i.e., service set identifier) of the Wi-Fi module of each LED lighting device within the indoor navigation system can be named separately or in groups (e.g., grouped according to an area) as desired. For example, the master bedroom 80 in the house of FIG. 5 can include six LED lighting devices named as: master bedroom-door (mb-door), master bedroom-desk (mb-desk), master bedroom-bed end 1 (mb-end1), master bedroom-bed end 2 (mb-end2), master bedroom-bed head 1 (mb-head1), and master bedroom-bed head 2 (mb-head2).

Alternatively, the node distribution plan of the indoor navigation system can be used to directly control operational or working status of any desired LED lighting device(s) in the house. For example, the user can select an individual LED lighting device or select LED lighting devices in an area to precisely control their working status.

The control interface 81 can also provide an azimuth mark 82 to show a position where the user is located in the house. The zooming buttons 83 can be used to enlarge or reduce a displaying range on a screen for the control interface 81. The brightness-adjusting buttons 84 can be used to adjust the brightness of LED lighting device(s) at selected node(s). The timer button 85 can be used to set a time for tuning on or turning off the LED lighting device(s) at the selected node(s). The search button 86 can be used to find an indoor location to be routed for navigation. The monitor button 87 can be used to statistically collect power consumption amount, running time, remaining lifetime, etc. of the LED lighting device(s) in the house. The setting button 88 can be used to configure the terminal application program and other related functions.

When starting an indoor navigation, the search button 86 can be clicked on to provide an input box for inputting a destination. After the terminal application program receives the destination, a navigation routing can be visually displayed on the control interface 81 according to the node distribution plan of the indoor navigation system. For example, the dotted line in FIG. 5 shows a navigation routing from the azimuth mark 82 in the living room to the big balcony of the house.

It is apparent that the control interface 81 is not limited to the interface design shown in FIG. 5, nor limited to a particular operating system. The control interface 81 can correspond to any suitable application program(s) running on any suitable operating system(s) with certain desired functions.

It is apparent that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Systems and methods based on LED lighting devices for indoor navigation control are provided. Multiple LED lighting devices can be widely distributed and relatively fixed in an indoor environment. Each LED lighting device can contain a Wi-Fi module and can have own location information stored in a location server having an own unique MAC address. That is, the actual location of each LED lighting device can be bound with its own unique MAC address.

In one embodiment, when a user enters into an unknown building, by communications among LED lighting devices, the location server, and a smart terminal (e.g., a smart phone), a node distribution plan for the unknown building can be generated and mapped. Each node corresponds to an LED lighting device. Compared with conventional Wi-Fi router-based technologies, the disclosed systems and methods can more accurately perform indoor positioning and navigation. For example, the disclosed systems and methods can be used in large venues, such as supermarkets, exhibition halls, and/or museums, to perform indoor positioning and navigation.

In addition, based on a current location of the user, promotion (e.g., shopping guide) and/or navigation information for that current location can be pushed to the user. Further, according to the positioning and navigation information, one or more LED lighting devices can be selected. The working (e.g., lighting) status of the selected LED lighting device(s) can be controlled.

REFERENCE SIGN LIST

LED lighting device 60
Driving power supply 61
LED light-emitting component 62
Wi-Fi module 63
RF (i.e., radio frequency) antenna 64
Room 70
Room 71
Wireless router/gateway 72
Wi-Fi signal coverage area 73
Expanded Wi-Fi signal coverage area 74
Indoor navigation control system 300
Smart terminal 2
Location server 3
Master bedroom 80
Control interface 81
Zooming buttons 83
Brightness-adjusting buttons 84
Timer button 85
Search button 86
Monitor button 87
Setting button 88

What is claimed is:

1. An indoor navigation control system containing LED lighting devices, comprising:
    at least two LED lighting devices configured in an indoor environment, wherein each LED lighting device comprises a Wi-Fi module and each LED lighting device is used as a wireless access node to receive a Wi-Fi signal and to transmit the received Wi-Fi signal to an adjacent node corresponding to an adjacent LED lighting device such that nodes within a Wi-Fi signal coverage area has an access to Internet or LAN (local area network); and
    a location server configured to store location information of the Wi-Fi module of each LED lighting device with a unique MAC address, wherein the at least two LED lighting devices and the location server are configured to communicate with a smart terminal to calculate a position, a moving direction, and a moving speed of an object according to the location information of each LED lighting device along with a moving time length of the object for an indoor navigation;

wherein:
    each LED lighting device further includes a driving power supply;
    in each LED lighting device, the Wi-Fi module is electrically connected to the driving power supply; and
    the Wi-Fi module of each LED lighting device is configured to control the driving power supply to control a switching status, brightness, and a color temperature of the LED lighting device according to a control command sent from the smart terminal.

2. The system according to claim 1, further comprising one of a wireless router and a wireless gateway, wherein the one of the wireless router and the wireless gateway comprises a Wi-Fi module.

3. The system according to claim 2, wherein the smart terminal is further configured to read status of each LED lighting device and to remotely control lighting of each LED lighting device.

4. The system according to claim 2, wherein the smart terminal is further configured to use the Wi-Fi module of each LED lighting device to transmit or receive a control command and a status command of each LED lighting device.

5. The system according to claim 1, wherein the smart terminal comprises a desktop computer, a laptop, a tablet PC, a smart phone, or a remote control.

6. The system according to claim 1, wherein the object for the indoor navigation comprises the smart terminal.

7. The system according to claim 1, wherein each LED lighting device further comprises an LED light-emitting component and a RF (radio frequency) antenna.

8. The system according to claim 7, wherein the Wi-Fi module of each LED lighting device is configured to receive data from a wireless router or a wireless gateway via the RF antenna, to process the data, and to send the processed data to the smart terminal via the RF antenna.

9. The system according to claim 1, wherein the Wi-Fi module and the driving power supply of each LED lighting device are integrated together on a same circuit board or are connected together via a connector.

10. The system according to claim 1, wherein the Wi-Fi module of each LED lighting device is attached on an outer surface of a housing of the LED lighting device or configured independently from the LED lighting device.

11. An indoor navigation control method using LED lighting devices, comprising:
configuring at least two LED lighting devices in an indoor environment to form a wireless local area network for data transmission, wherein each LED lighting device comprises a Wi-Fi module and each LED lighting device is used as a wireless access node to receive a Wi-Fi signal and to transmit the received Wi-Fi signal to an adjacent node corresponding to an adjacent LED lighting device;
storing location information of the Wi-Fi module of each LED lighting device having a unique MAC address into a location server using a Wi-Fi positioning method;
generating a node distribution plan using a triangulating estimation method to calibrate a node distribution, according to the location information of each LED lighting device in the location server along with a Wi-Fi signal strength; and
calculating a position, a moving direction, and a moving speed of an object in the indoor environment according to the location information of each LED lighting device and a moving time length of the object for an indoor navigation based on the node distribution plan;
wherein:
each LED lighting device further includes a driving power supply;
in each LED lighting device, the Wi-Fi module is electrically connected to the driving power supply; and
the Wi-Fi module of each LED lighting device is configured to control the driving power supply to control a switching status, brightness, and a color temperature of the LED lighting device according to a control command sent from the smart terminal.

12. The method according to claim 11, further comprising calibrating and optimizing the node distribution plan by uploading a building floor plan.

13. The method according to claim 12 where the building floor plan is encrypted and downloading the building floor plan requires a downloading authorization, when the building floor plan involves a building structure secret.

14. The method according to claim 11, wherein generating the node distribution plan is implemented by a smart terminal, wherein the smart terminal allows the Wi-Fi module of each LED lighting device to be independently named such that precise location information of each named LED lighting device is conveniently known and controlled, and wherein the Wi-Fi module of each LED lighting device is independently named in a group.

15. The method according to claim 11, wherein the step of generating the node distribution plan further comprises reading status of each LED lighting device and remotely controlling each LED lighting device by using an administrator managing mode requiring an authorization to manage lighting control, internet access, and the node distribution plan of each LED lighting device.

16. The method according to claim 11, further comprising pushing shopping guide and navigation information to the object based on the position of the object.

17. The method according to claim 11, wherein the object for the indoor navigation comprises the smart terminal.

18. The method according to claim 11, further comprising using the node distribution plan to remotely control one LED lighting device or to remotely control all LED lighting devices configured in an area of the indoor environment.

19. The method according to claim 18, wherein the remote control comprises control of switching on/off, adjusting brightness, setting time for turning on/off, and statistically collecting power consumption amount of one or more LED lighting devices.

20. The method according to claim 18, wherein the Wi-Fi module and the driving power supply of each LED lighting device are integrated together on a same circuit board or are connected together via a connector.

* * * * *